United States Patent [19]

Strazar

[11] Patent Number: 5,013,195
[45] Date of Patent: May 7, 1991

[54] ROUTER GUIDE

[76] Inventor: Frank Strazar, 12 Dumont St., Willowdale, Ontario, Canada, M2M 3B8

[21] Appl. No.: 506,342

[22] Filed: Apr. 9, 1990

Related U.S. Application Data

[63] Continuation-in-part of Ser. No. 351,783, May 15, 1989, abandoned.

[51] Int. Cl.$^5$ .................... B23C 1/20; B27C 5/00
[52] U.S. Cl. ...................... 409/180; 144/134 D
[58] Field of Search ............ 409/175, 178, 180, 181, 409/182; 144/134 D

[56] References Cited

U.S. PATENT DOCUMENTS

| | | | |
|---|---|---|---|
| 2,672,898 | 3/1954 | Schuster | 144/134 D |
| 2,705,032 | 3/1955 | Pearson | 144/134 D |
| 2,839,107 | 6/1958 | Emmons | 144/134 D X |
| 3,207,193 | 9/1965 | Godfrey | 144/134 D |
| 3,454,061 | 7/1969 | Cordone et al. | 409/182 X |
| 3,494,394 | 2/1970 | Stock | 144/134 D |
| 3,517,712 | 6/1970 | Selowitz | 409/178 |

FOREIGN PATENT DOCUMENTS

| | | | |
|---|---|---|---|
| 241773 | 11/1960 | Australia | 144/134 D |
| 630729 | 11/1961 | Canada | 144/134 D |
| 954737 | 12/1956 | Fed. Rep. of Germany | 144/134 D |
| 1320451 | 1/1963 | France | 144/134 D |

Primary Examiner—William Briggs

[57] ABSTRACT

A router guide apparatus having a support arm attached to the router, a base plate supported on the support arm, an opening in the base plate through which a router bit may pass, and, a router guide member on the base plate, the router guide member having a semi-cylindrical surface area having a radius substantially equal to the radius of the router bit.

10 Claims, 4 Drawing Sheets

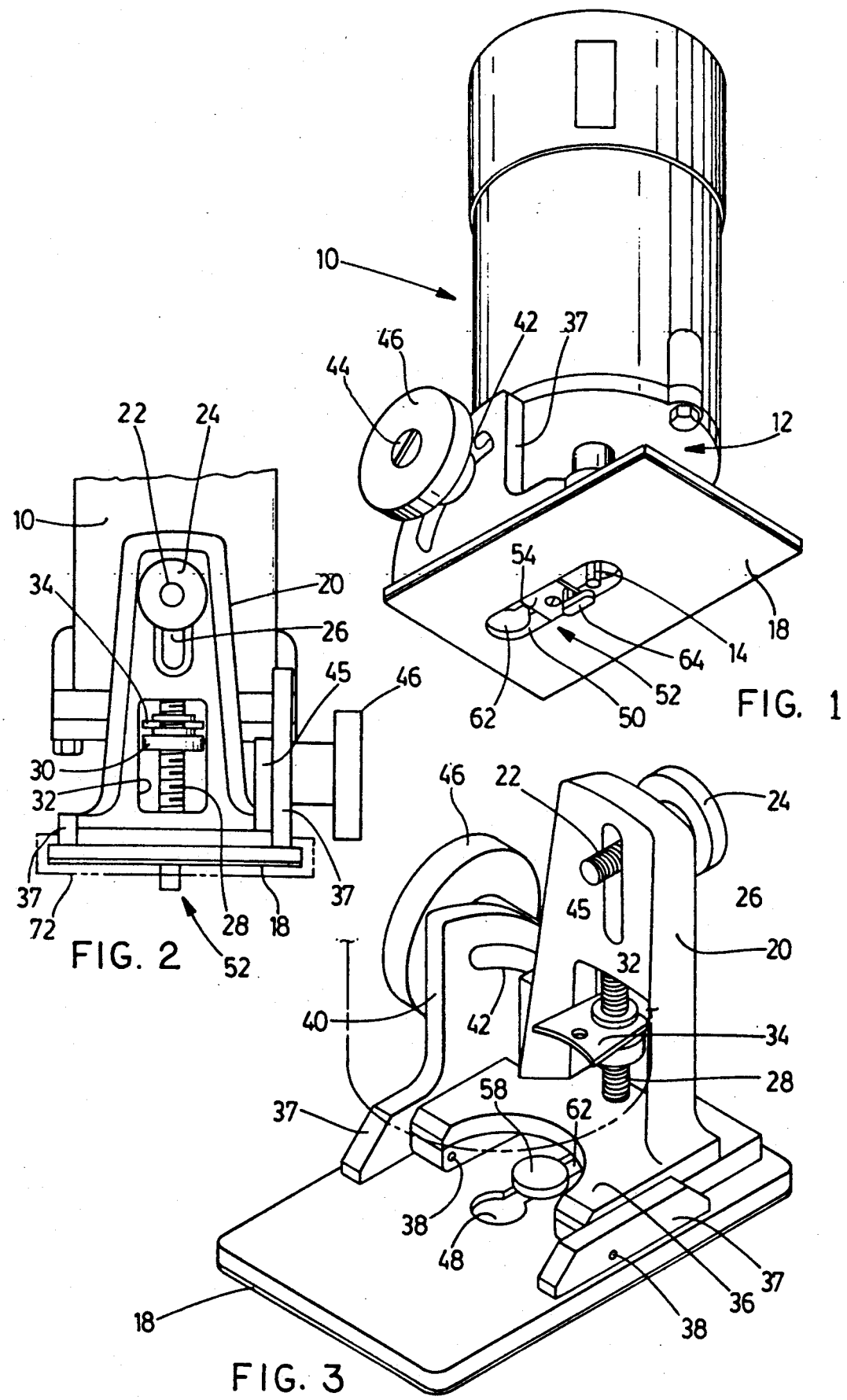

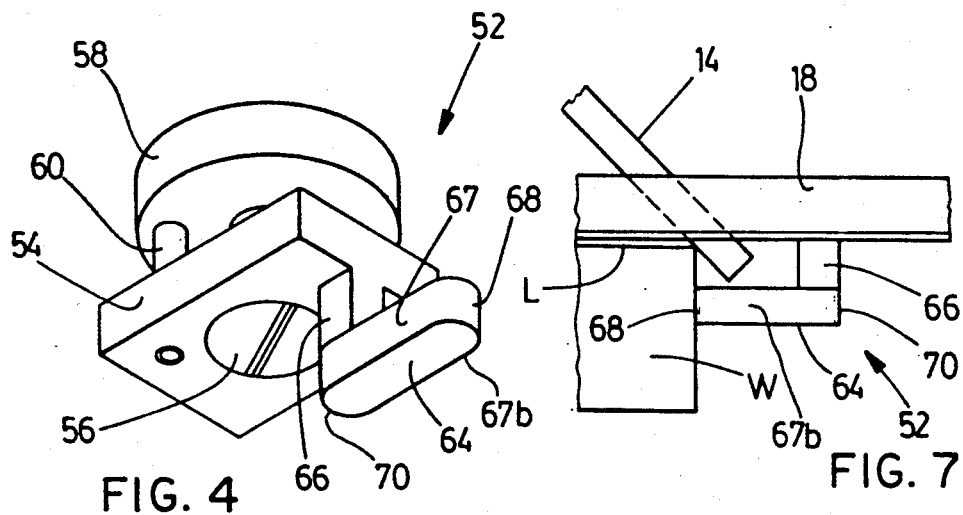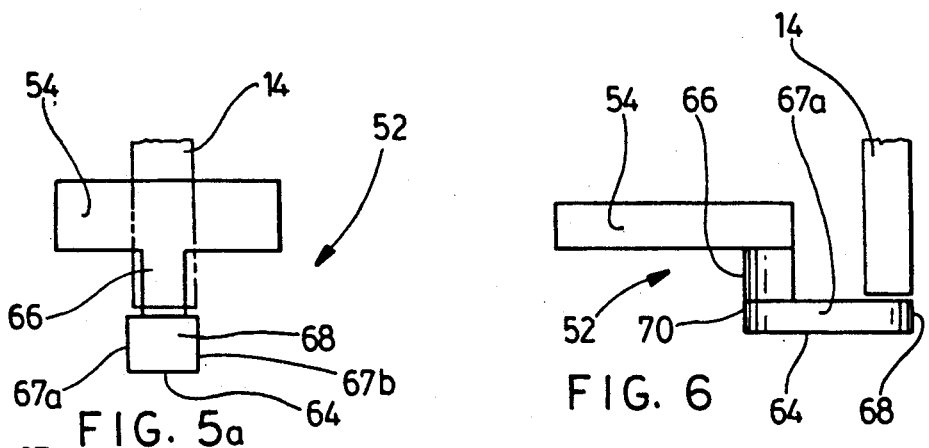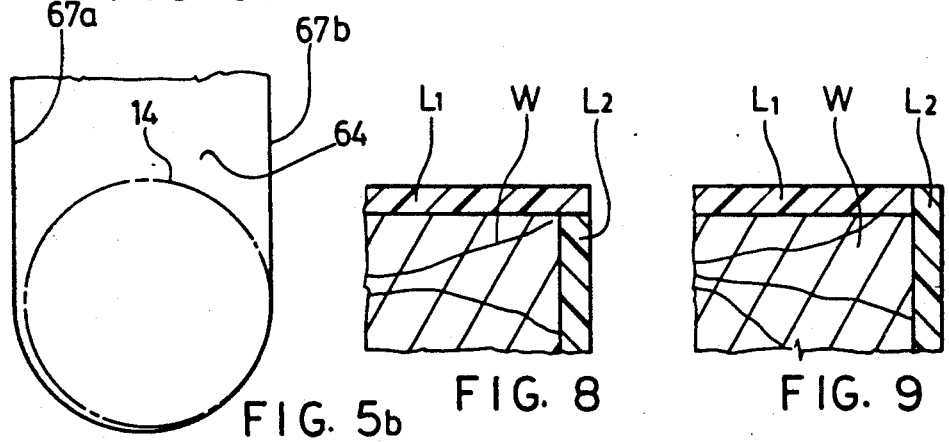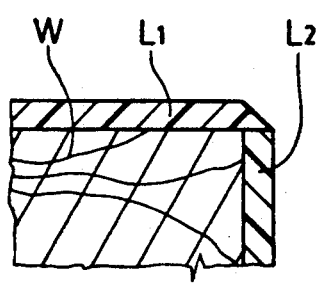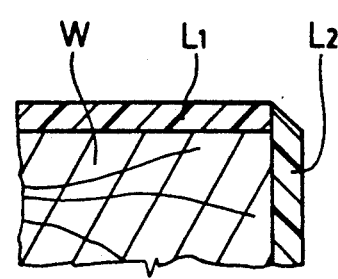

ROUTER GUIDE

This Application is a Continuation-In-Part of U.S. application Ser. No. 351,783 filed May 15, 1989, for Router Guide, now abandoned, Inventor Frank Strazar.

FIELD OF THE INVENTION

The invention relates to routers, and in particular to a guide apparatus for routers and, in particular, to a guide apparatus which guides the router along edges, into corners and small openings, and around angles, and other areas which are hard to reach.

BACKGROUND OF THE INVENTION

Routers may generally be defined as hand-held power driven tools, in which a router bit is rotated rapidly against a work piece. Various different bits are provided for producing different formations in a work piece such as wood, plastic materials, or softer metals.

Routers are widely available in a range of sizes and horsepowers. Routers at the low end of this range are usually used for edge trimming of materials such as laminates. These laminates may include veneers, plastic laminates, light gauge metals and the like. Such laminates may be applied to a base material to provide a desired surface effect. For example, plastic laminates such as "Arborite" (trade mark) and similar laminate materials are used as surfaces on items such as counter tops, table tops, doors, walls, and the like, both in the home and in numerous commercial institutions such as retail stores, banks, and the like.

In the great majority of cases, these laminates are applied on a custom-made basis. In many cases, especially in commercial institutions, relatively complex formations or grooves or recesses may be formed in these counter tops, or other surfaces, and the laminate is required to be applied to the interior surfaces of these recesses. In almost all cases, the laminate is applied with a substantial overlap, extending over the edge of the base material. Adhesive is used to apply to laminate, and when the adhesive is cured, the excess edge portions of the laminate are trimmed away. This is customarily done with a small hand-held router, known in the trade as an edge trimmer.

This tool has a capacity to accept router bits of varying diameters, for various different jobs. In order to guide these routers or edge trimmers, along the edge of a work piece, a crude form of roller device has been provided which, in some cases, clamped on the side of the router, and in others on the bit itself. This roller was intended to ride along the side edge of the work piece, so as to ensure a uniform cut with the router bit along the edge. In practice, however, the design of the roller guide was such that they could not enter into corners, or small recesses. In these areas, the guide must simply be removed and the router controlled by hand alone. This is, in fact, virtually impossible, and the usual practice is to use a hand file instead.

The router bit rotates at up to 30,000 r.p.m. An operator cannot control the direction of a hand-held router at these speeds. Consequently, the laminate may be damaged. If this happens the entire job must be reworked. This means cutting a new base, applying a new laminate surface, and again retrimming the edge. Further problems arise due to the complexities of the design of the counter top or other base. It is usually required to apply a laminate both to the top surface and to the edge surfaces. This is also true when grooves or recesses are formed in the counter top. Laminates must be applied to the exposed surfaces of the recess. Where an edge surface meets a top surface, the procedure is to apply one part of the laminate, i.e., either the top surface or the edge surface first, trim it back, and then apply the other portion of the laminate, to the other surface and then trim it back.

The end result, which it is intended and desired to achieve, is a corner junction between, for example, the top surface laminate and the edge laminate, which is perfectly joined, and trimmed. In some cases, it is desirable to provide a bevel surface on the edge, either of the top surface laminate or the edge laminate, which overlaps the other laminate. This process is particularly difficult to achieve. It means that the first laminate surface to be applied must be trimmed square and exactly flush with the edge of the base material. The second laminate must then be applied, overlapping the trimmed edge of the first laminate. The edge of the second laminate must then be trimmed along a bevel angle, so as to overlap the edge of the first laminate. Using the relatively crude roller guide system presently available, this task is simply impossible. In practice, when a workman is asked to perform this task, he does not use the router or edge trimmer at all. Instead he simply works with a hand file. This is highly skilled work, and must be done slowly and carefully, and seldom, if ever, produces a perfect result.

In order to overcome some of these problems, routers have been developed in which the bit is set at a predetermined angle to the base plate. These so called "bevel" routers were also difficult to control by hand, and were subject to the disadvantages noted above, and explained in more detail below.

In some cases, it is necessary to use such a router or edge trimmer in confined spaces such as, for example, around the edges of an inside opening. For example, it may be required to apply a laminate over a door, or over a metal plate, having a series of recesses or openings, e.g., hinge recesses, lock openings, or openings for push buttons. The laminate must be trimmed around the edge of each of the recesses or openings. Preferably, in order to trim the edges around such openings, all that would be required would be to simply apply a layer of laminate over the entire panel, covering the openings. Holes would then simply be drilled through the laminate registering with each of the openings. The router bit would then be inserted through the drilled holes, and the edges trimmed. In practice, however, using existing routers and guides, this is impossible. This type of work must simply be done by laborious hand filing.

BRIEF SUMMARY OF THE INVENTION

With a view to overcoming the various disadvantages noted above, the invention comprises a guide apparatus for use in association with a router, said router being adapted to receive a bit having a predetermined diameter, said guide apparatus, in turn, comprising support means adapted to be attached to said router, plate means supported on said support means, opening means in said plate means through which said router bit may pass, a leg portion extending from said plate means, and, a router guide member mounted on said leg portion, said router guide member defining a semi-cylindrical surface portion, said semi-cylindrical portion defining a radius substantially equal to the radius of a said router bit, said semi-cylindrical portion being adapted to be positioned substantially coaxially with said router bit, and wherein said leg portion has a width less than the width of said guide member.

More particularly, it is an objective of the invention to provide a guide apparatus as described above, wherein said plate means is pivotally connected to said support means, whereby said plate means may be positioned normal to said router bit, or at an angle thereto.

More particularly, it is an objective of the invention to provide a guide apparatus as described above wherein said guide member is moveably attached to said plate means, and may be slid towards and away from said bit opening means.

More particularly, it is an objective of the invention to provide a guide apparatus having the foregoing advantages wherein there are a plurality of router bits, having varying radii, and including a plurality of said guide members, and wherein said semi-cylindrical portions thereof have predetermined radii corresponding substantially to the predetermined radii of respective said router bits.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 1 is a lower perspective illustration showing a router, with the router guide assembly in accordance with the invention attached thereto;

FIG. 2 is a rear elevation of the router guide assembly;

FIG. 3 is a side elevation of the router guide assembly;

FIG. 4 is an enlarged lower perspective illustration of the router guide member of the router guide assembly;

FIG. 5A is a front elevational view of the router guide member of FIG. 4;

FIG. 5B is a greatly enlarged lower plan view showing a portion of the router guide member shown greatly enlarged, and showing the location of the router bit in phantom.

FIG. 6 is a side elevation of the guide mmember of FIG. 4;

FIG. 7 is a schematic side elevation, illustrating the router bit making a "bevel" edge cut;

FIGS. 8 and 9 show two different forms of edges with laminates trimmed at a right angle;

FIGS. 10 and 11 show two different forms of edges with laminates trimmed at a bevel angle.

DESCRIPTION OF A SPECIFIC EMBODIMENT

Figure 12:
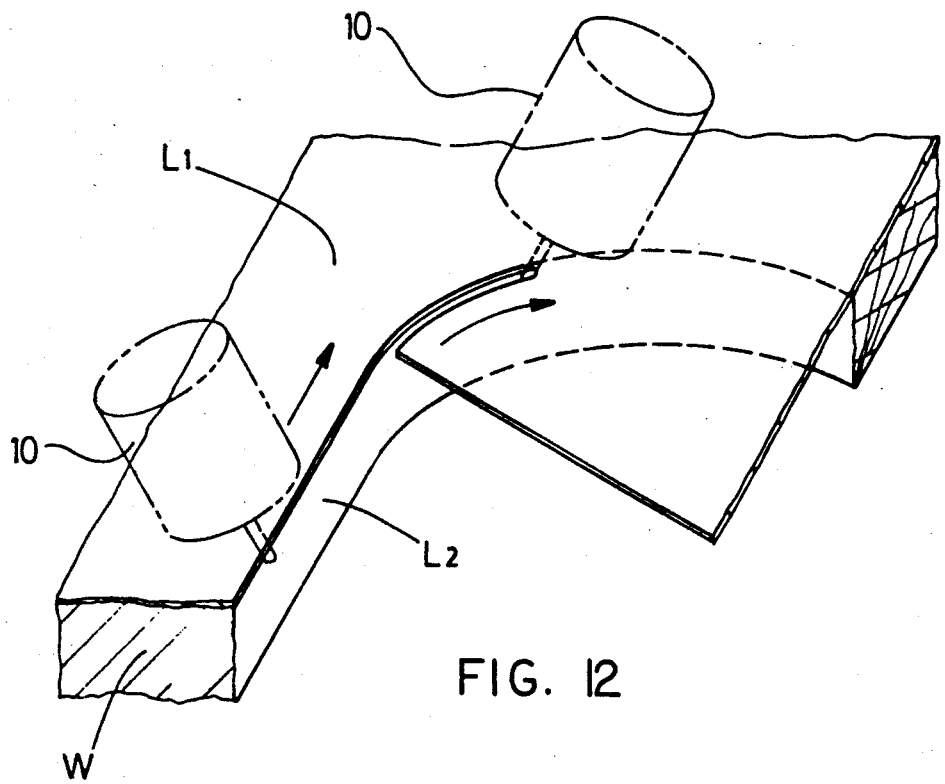
FIG. 12 is a schematic illustration showing one mode of useage of a router, together with a router guide member according to the invention.

Referring first of all to FIG. 1, there is illustrated a typical router indicated generally as 10. Such routers of the type shown as router 10 are typically smaller hand-held routers, as distinguished from the larger more powerful type of router adapted to be mounted on some form of support system or jig. Such small hand-held routers are used for finer detail work, and in particular for trimming the edge of laminates applied to a sub-strate. Typical examples are counter-tops, of particle board for example, to which plastic laminates are adhesively bonded. Other examples are doors, both full-sized doors and cupboard doors, desk tops, and elevator interiors, to mention only a few of the more obvious examples.

The procedure for applying such laminates is to cut the laminate sheet to a size which is somewhat oversized for the surface to which it is to be applied. It is then adhesively bonded to the surface of the sub-strate, with an overlap portion extending all the way around. The overlap portion is then trimmed away. Sometimes the trim is what is known as a "flush" trimmed, i.e., at 90 degrees, and, in other cases, it may be a "bevel" trimmed, i.e., at an angle. Trimming laminates with a hand-held router is not an easy task even for a skilled workman. The router naturally tends either to gouge into the workpiece, or move away, due to the torque of the bit. Routers of this type incorporate a chuck indicated as 12 holding bits of various diameters, indicated as 14.

In accordance with the invention, a base plate 18 is provided, mounted on a side arm 20. The side arm 20 is attached at one side of the body of the router 10 by any means such as a threaded stud 22, and knurled nut 24. Stud 22 passes through a slot 26 formed in side arm 20, to permit upward and downward adjustment of side arm 20.

In order to provide for fine adjustment, a threaded stud 28 is fastened to side arm 20. A grooved nut 30 is threaded on stud 28, and is accessible through the window opening 32 in side arm 20. A yoke plate 34 is fastened to router 10, and rides in the grooved nut 30. By loosening the nut 24, and rotating the nut 30, the position of the side arm relative to the router can be adjusted. Once adjusted to the right position, the nut 24 is then tightened up securing it in position.

Side arm 20 is formed with a right angular support portion 36. Base plate 18 has support plates 37 fastened perpendicular thereto, and these, in turn, are pivotally mounted to the support portion 36 as by pivot pins 38.

The angular position of the base plate 18 may be adjusted, by means of adjustment bracket 40, formed with an arcuate slot 42. In this embodiment, the adjustment bracket 40 and one of the support blocks 37 are formed integrally. A threaded stud 44 is secured to plate 45, secured to support portion 36, and a knurled nut 46 is threaded on stud 44. By loosening the nut, the base plate may be tilted, about pins 38, to the desired angle, and the nut may then be tightened up to secure it in position.

Base plate 18 is formed with a bit opening 48, located more or less in the centre of the plate, and the bit 14 extends through opening 48.

The base plate 18 is further formed with an elongated recess 50, extending from opening 48 (FIG. 1). Within the recess 50, an adjustable router guide member 52 (FIG. 4) is located. The router guide member 52 comprises a rectangular plate portion 54, adapted to make a sliding fit in recess 50. Plate portion 54 is connected by means of adjustment screw 56 to a retention disc 58. An anti-rotation pin 60 is secured in disc 58 and makes a sliding fit in plate portion 54.

Base plate 18 is formed with a key-hole shaped slot 62 (FIG. 3), formed within the larger elongated recess 50. The key-hole shaped slot 62 is adapted to receive the retention disk 58, and plate portion 54 can then slide to and fro within the limits of the recess 50.

In this way, the position of the router guide member 52 can be adjusted to and fro along recess 50 and secured relative to router bit 14, for reasons to be described below.

The router guide member 52 further comprises a guide boss 64, secured to plate portion 54 by means of a leg portion 66, extending at right angles from one end of the boss 64. The remainder of the boss 64 extends forwardly from the leg portion 66, in a plane parallel to, but spaced from, the plane of plate 54. Boss 64 is formed with planar side surfaces 67a and 67b, and at its leading edge 68 with a semi-cylindrical profile of a predetermined radius. The boss 64 is formed at its rearward end 70 with a similar semi-cylindrical profile.

In FIGS. 5 and 6, the retention disc is omitted for the sake of clarity and the router bit is indicated, in phantom. It will be observed that the width of the boss 64 is preferably substantially equal to, or slightly greater than the diameter of the bit 14. The radius of curvature of the profile 68, corresponds substantially to, but is slightly greater than the radius of the bit 14.

The leg portion 66 is of reduced width in comparison with the diameter of the bit, and is also of reduced width in relation to the width of the boss 64 for reasons described below.

It will be observed from FIG. 5A and particularly from FIG. 5B, that the boss 64 is slightly wider than the leg portion 66, along its side surface 67A, and on its side surface 67B, the excess width of boss 64 is somewhat increased compared with that on side 64A. The reason for this will be explained below.

In most cases, an operator will wish to use bits over a range of different sizes and diameters for different types of cuts and different types of material. Accordingly, the invention will provide a plurality of guide members 52, wherein the bosses 64 are formed with a range of widths and radii of curvature, which substantially correspond to slightly more than the diameter and radius of curvature of each of the bits to be used with that router.

It will also be observed from FIG. 4 that the leg portion 66 has a width which is reduced in relation to the width of the boss 64, for reasons to be described below. In a typical case, most of the work will be done with router bits in the range of ¼ to ½ of an inch, but bits of other sizes may be used.

It will also be appreciated that the length of the boss 64 must also be increased or decreased in certain cases, in order to give adequate clearance between the leg 66 and the router bit 14.

In operation, a bit 14 is selected for a particular job. A guide member 52 having a boss 64 with a width, and radius of curvature, substantially corresponding to slightly more than that of the bit 14, is also selected. The guide member 52 is then fitted in the recess 50, with the retention disk 58 fitting within the key hole slot 62. The router bit 14 is then inserted in the chuck 12 of the router 10. Assuming a right angle or so-called "flush" cut is to be made, as shown for example in FIG. 9, then the guide member 52 is adjusted so that the leading end 68 of the guide boss 64 registers with the router bit 14 (see FIG. 6). For the purposes of this description, the semi-cylindrical end portion 68 of the guide boss 64 is deemed to have a central axis, where any two radii would meet. This central axis is to be arranged, in accordance with the invention, substantially coaxial with but slightly offset, relative to the central axis of the router bit 14.

The side surface 67B of the boss 64 is arranged so as to be as nearly as possible lying in the plane of the side of the router bit 14, and the side surface 67A of the boss 64 is arranged so as to extend slightly outwardly relative to the plane of the opposite side of the router bit 14.

For the purposes of this discussion, the side surface 67B of the guide boss 64 is regarded as the "workpiece surface", and the side surface 67A of the boss 64 is regarded as the "free surface".

The laminate L1 is applied to the workpiece with adhesive with a portion overlapping and the adhesive is allowed to cure.

The router is then started up. The base plate 18 is then placed on the top surface of laminate L1 (FIG. 9). The router then cuts through the overlapping portion of laminate L1 until boss 64 reaches the edge of workpiece W. The router is then rotated and the guide boss 64 is placed with its workpiece surface 67B lying against the workpiece W. With the leading end 68 pointing in the direction in which the cut is to be made, the router is then moved along through the overlapping edge of laminate L1. The router bit 14 will thus progressively cut a slot through the edge portion of the laminate, cutting it flush with the edge of the workpiece. Assuming the workpiece is, for example, a counter top, which may be of L-shaped construction, in section, that is to say it would have a planar countertop surface, and for example a vertical front edge strip, and in addition, such a countertop might terminate at one or both ends in a right angle also having an edge flange located perpendicular. In this case, it is necessary to trim the junction between the planar countertop surface and the front edge flange, and it is also necessary to trim the junction between the planar countertop and the end flange, and it is also necessary to trim the vertical junction between the front flange and the end flange.

All three trim cuts can be made using the router, without being obliged to change the setting or adjustment of the router bit and guide member.

In the event that there is for example a countertop having an L shaped return, having a planar surface, then it will be understood that the router bit can proceed along the edge of the workpiece, trimming the edge of the laminate right into the apex of the L-shaped corner. The bit can then be worked around the corner, so as to trim the edge of the L-shaped portion. The leg portion 66 of the guide member 52 is of reduced width and relation to the guide member 64 and the router bit 14, and consequently facilitates this change of direction.

It will be appreciated, that since the leg 66 is slightly narrower than the diameter of the router bit, that it is possible to simply start the cut either from an oversized hole drilled in an unwanted portion of the laminate, or as described above, simply starting the cut at the edge of the laminate itself, somewhat in the manner of a jig saw.

Figure 13:
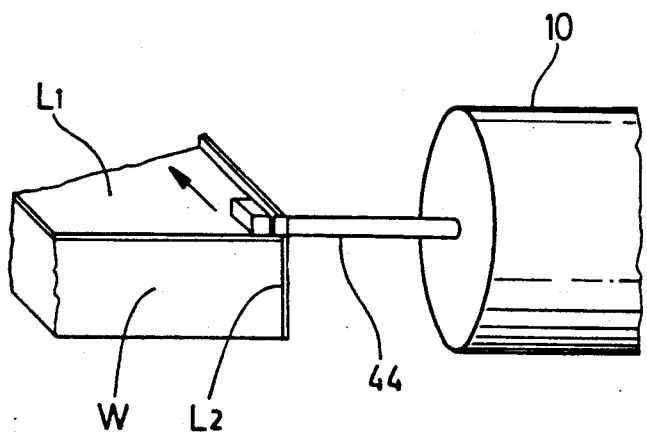
FIG. 13 is a schematic illustration of another mode of use.

As illustrated in FIG. 9, it may be desirable to then apply a second piece of laminate L-2 on the side edge of the workpiece. This piece of laminate L-2 can then also be flush trimmed, with the router held on a horizontal axis (FIG. 13).

This will provide a junction between the two pieces of laminate L-1 and L-2, where the laminate L-2 overlaps the laminate L-1.

Clearly, an overlap in the opposite manner can also be achieved as shown in FIG. 8. In this case, the side edge piece of laminate of L-2 is applied first and is then trimmed flush with the top surface of the workpiece W. The top surface Laminate L-1 is then applied and is then trimmed flush with the outer surface of the laminate L-2.

Bevel cuts can also be formed as shown in FIGS. 7 and 11. In this case, the base plate 18 is tilted relative to the bit 14 to place the bit at the desired angle of cut, for example, 45 degrees.

It will also be appreciated that many of the straight cuts can be achieved using the base plate tilted as for bevel cutting. All that is required is to simply use the router with the base plate 18 tilted, and cut along the axis of the guide member 64. This will then produce a right angle cut on the laminate. This mode of operation thus avoids the necessity for resetting the tilt angle of the base, and avoids the necessity for resetting and adjusting the position of the guide member 52 within the key hole slot 62, between cuts.

Figure 14:
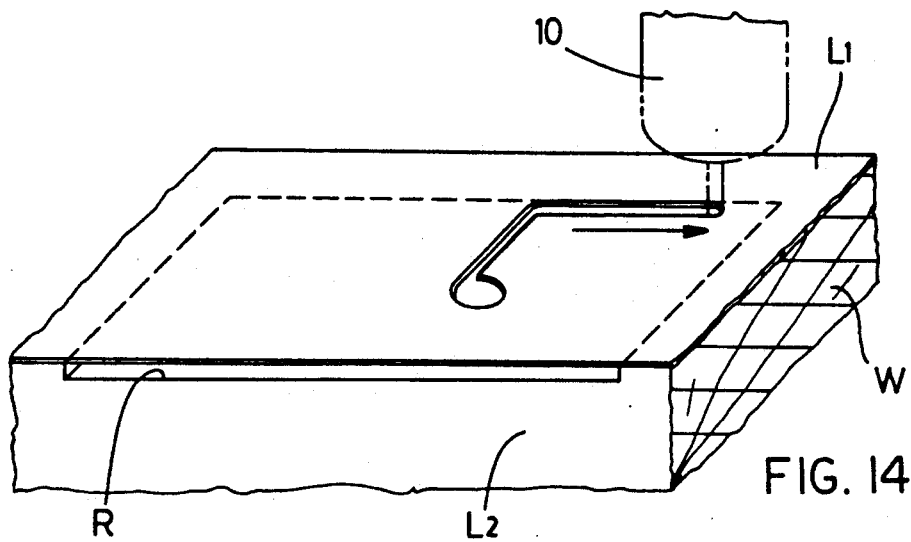
FIG. 14 is a schematic perspective illustration of a still further mode of useage.

This is in fact illustrated in FIG. 12. The router, with the guide assembly attached, can also be used for cutting out laminates applied over shallow recesses as illustrated in FIG. 14. This figure illustrates a work piece W such as a door, in which a hinge recess R has been cut. The laminate L1 has then been applied over the entire surface, and it is then necessary to cut out the laminate in the region of the recess R. This is done simply by drilling an oversized hole in the laminate, inserting the router bit with the guide member, and making a cut to one edge of the recess and then simply cutting around the edge of the recess. The same operation can be carried out where laminates are applied on doors over, for example, openings formed for locks, the function being essentially the same as that illustrated in FIG. 14 and, therefore, a separate illustration is not deemed required.

The invention can be used in this type of application where the clearance beneath the laminate is as little as ⅛ of an inch.

Figure 15:
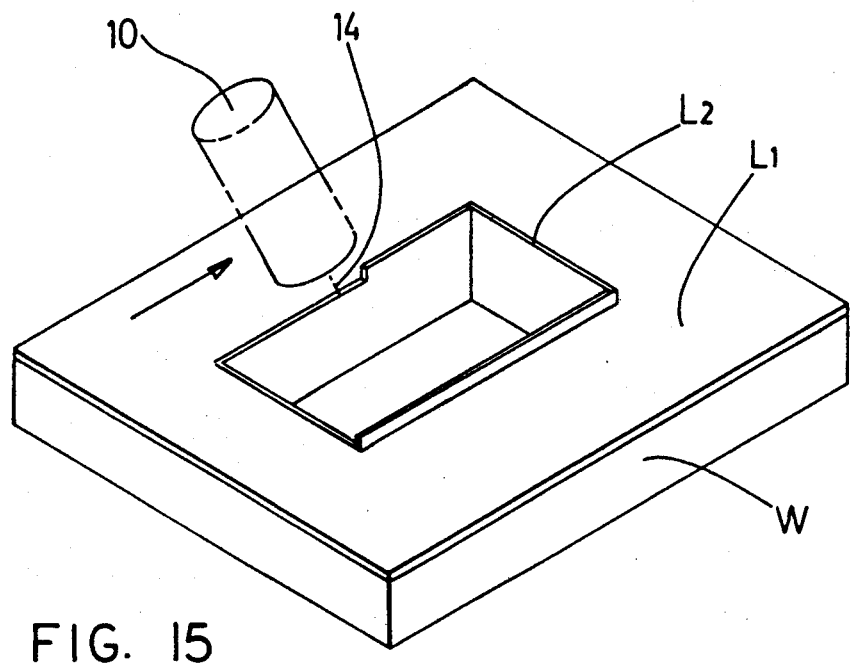
FIG. 15 is a schematic perspective illustration of a further mode of useage, around an interior opening in a work piece.

In certain applications, it is desirable to cut out recesses or openings in a work piece, and then to line the interior surfaces of the opening. This function is illustrated in FIG. 15. In this case, where the laminate L1 is applied first, and the portions of laminate L2 within the recess are applied last, there will be an upstanding strip of laminate L2 surrounding the opening. This will then prevent the base plate 18 from lying flat on the work piece. Accordingly, in this embodiment, it is desirable to use the raise plate 72 (illustrated in phantom in FIG. 2). Raise plate 72 can be releasably attached to base plate 18 in any suitable manner (not shown).

Using the raise plate, it is then possible to trim either flush at 90 degrees, or at a bevel angle, both functions being illustrated in FIG. 15.

Figure 16:
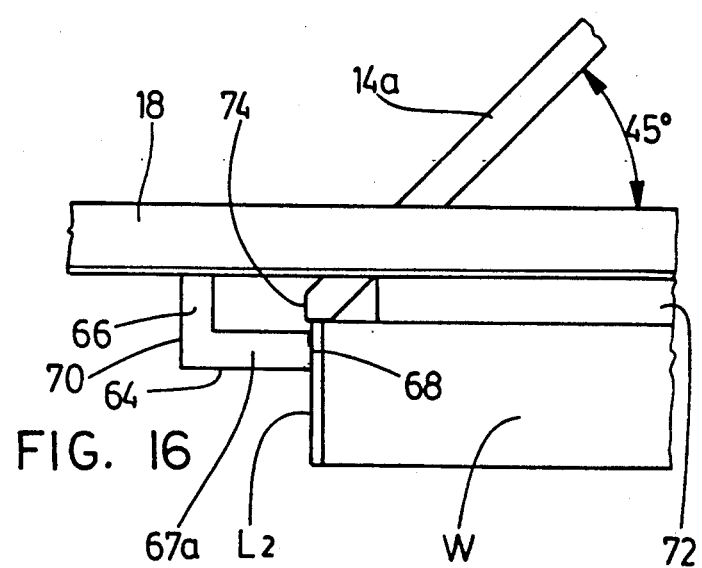
FIG. 16 is a perspective side elevation of a further mode of useage.
Figure 17:
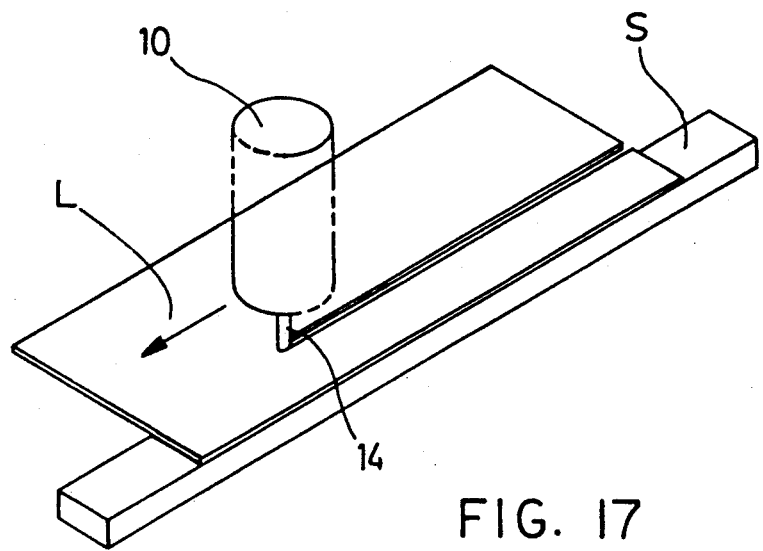
FIG. 17 is a schematic perspective of a still further mode of useage, wherein the invention is used for simply cutting a strip of a laminate, without the use of a saw.

In certain cases, it is desirable to apply the laminates the other way around. In other words, the laminate L2 applied around the interior surfaces of the opening is applied first and is then trimmed flush. This function is illustrated in FIG. 16. In this case, the laminate L2 has been applied first. The edge-trimming function is then carried out using the base plate 18 set at 45 degrees to the router axis, and using a router bit 14A, having an angled cutting surface 74 at the tip of the bit. In this way, a flush cut can be achieved.

The laminate L1 is then applied on top of this, covering the flush trimmed edge of the laminate L2.

The function of the excess width of the boss 64, on the free surface side, is simply to prevent inadvertently damaging other portions of the workpiece, when working around corners, since the excess width of the boss along the free surface side 67A prevents the router bit from coming into contact with any portions of the workpiece, which it is not intended to cut.

The actual degree of margin required is slight. Wherever used herein the terms "substantially equal to" and "substantially coaxial" where they are used are intended to encompass this slight degree of safety margin, and whereever used are intended to be so interpreted.

The invention can also be used for purposes other than simply trimming laminates already applied to a work piece. In some cases, it is desirable to cut a piece of laminate to a predetermined size, and then apply it to a work piece. This is particularly true where repair work is being done. In this case, it is normally necessary for workmen to set up an elaborate work bench, and to support the laminate, and then cut it with a power saw. Frequently, the laminate is damaged by the saw blade.

In order to avoid this, the present invention permits the workmen to make such a cut in a piece of laminate, without such complications. In this case, a wooden strip indicated as S is clamped to the sheet of laminate L by any clamping means (not shown) such as is well known in the art. The router is then simply applied to the edge of the laminate sheet L, with the guide member running against the side of the wooden strip S. It is then possible for the workmen to make a clean cut to a precisely measured width, without damaging the laminate surface. In addition, this work could be carried out on almost any work place, and even simply carried out on the floor, since the router guide member requires very little clearance beneath the sheet.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A guide apparatus for use in association with a router, said router being adapted to receive a router bit, said guide apparatus, in turn, comprising:
   support means adapted to be attached to said router;
   base plate means supported on said support means;
   opening means in said base plate means through which a said router bit may pass;
   a router guide member mounted on said plate means, said router guide member including a leg portion extending substantially normal to said base plate means, and a guide boss mounted on said leg portion, spaced from said base plate means, and defining a semi-cylindrical surface portion, said semi-cylindrical surface portion defining a radius slightly greater than the radius of a said router bit, and,
   adjustment means securing said guide boss to said base plate means whereby said semi-cylindrical surface portion is adapted to be positioned slightly offset relative to the axis of said router bit, and wherein said boss defines a predetermined width, and wherein said leg portion has a width less than that of said boss, and wherein said guide boss is shaped and dimensioned whereby one side surface thereof is adapted to lie in a common plane with one side of said router bit, and wherein the other side surface thereof is adapted to lie in a plane parallel to, but spaced outwardly from the plane of the opposite side of said router bit.

2. A guide apparatus as claimed in claim 1, wherein said base plate means is pivotally connected to said support means, whereby said base plate means may be positioned normal to said router bit, or at an angle thereto.

3. A guide apparatus as claimed in claim 1, wherein said guide member is moveably attached to said base plate means, and may be slid towards and away from said opening means.

4. A guide apparatus as claimed in claim 1, wherein there are a plurality of router bits, having varying radii, and including a plurality of said guide members, and wherein said semi-cylindrical portions thereof have predetermined radii substantially corresponding to the predetermined radii of respective said router bits.

5. A guide apparatus as claimed in claim 1, wherein said router guide member comprises sliding plate means, leg means extending from said plate means, and said guide boss being mounted on said leg means.

6. A guide apparatus as claimed in claim 5, wherein said leg portion is substantially normal to said plate means, and wherein said guide boss defines an elongated body portion, having two ends, and semi-circular surfaces on said ends, and located substantially normal to said leg portion.

7. A guide apparatus as claimed in claim 1, including an elongated slot formation formed in said base plate means, and wherein said support plate means of said guide member is slidingly received in said opening, and including fastening means for securing said support plate means at a desired location in said slot.

8. A guide apparatus as claimed in claim 1, wherein said support means is moveable relative to said router, and including means for securing same in a desired position.

9. A guide apparatus as claimed in claim 7, and wherein said guide member includes a sliding plate means adapted to fit in said elongated slot formation, and a retention member adjustably connected to said sliding plate means, by connection means, said connection means extending through said elongated slot formation, and said sliding plate means being slidingly retained therein by said retention member.

10. A guide apparatus as claimed in claim 2, including an adjustment bracket means fastened to said base plate means, a generally arcuate slot formed therein, and threaded means extending from said support means through said arcuate slot, and being releaseably lockable, whereby to release and lock said adjustment bracket means, thereby locating said base plate means at a desired angle.

* * * * *